(12) United States Patent
Hatfield

(10) Patent No.: US 9,073,011 B2
(45) Date of Patent: Jul. 7, 2015

(54) SYSTEMS AND METHODS FOR DIESEL OXIDATION CATALYST WITH DECREASED $SO_3$ EMISSIONS

(71) Applicant: Randal Hatfield, Camarillo, CA (US)

(72) Inventor: Randal Hatfield, Camarillo, CA (US)

( * ) Notice: Subject to any disclaimer, the term of this patent is extended or adjusted under 35 U.S.C. 154(b) by 289 days.

(21) Appl. No.: 13/856,855

(22) Filed: Apr. 4, 2013

(65) Prior Publication Data

US 2014/0301926 A1    Oct. 9, 2014

(51) Int. Cl.
*B01D 53/56* (2006.01)
*B01D 53/94* (2006.01)

(52) U.S. Cl.
CPC .................... *B01D 53/944* (2013.01)

(58) Field of Classification Search
CPC ...................................... B01D 53/944
USPC .............................. 423/213.5, 325
See application file for complete search history.

(56) References Cited

U.S. PATENT DOCUMENTS

| | | | |
|---|---|---|---|
| 5,371,056 A | 12/1994 | Leyrer et al. | |
| 5,580,553 A * | 12/1996 | Nakajima | 424/78.17 |
| 6,938,411 B2 | 9/2005 | Hoffmann et al. | |
| 7,393,809 B2 * | 7/2008 | Kim | 502/326 |
| 7,563,744 B2 | 7/2009 | Klein et al. | |
| 8,168,125 B2 | 5/2012 | Choi | |
| 2008/0125308 A1 * | 5/2008 | Fujdala et al. | 502/74 |
| 2009/0324468 A1 | 12/2009 | Golden et al. | |

FOREIGN PATENT DOCUMENTS

GB          EP0605142 A1 *  7/1994  ............... B01J 37/02

* cited by examiner

*Primary Examiner* — Colleen Dunn
*Assistant Examiner* — Haytham Soliman
(74) *Attorney, Agent, or Firm* — Barnes & Thornburg LLP; Thomas J. McWilliams; Edward F. Behm, Jr.

(57) ABSTRACT

A diesel oxidation catalyst (DOC) catalytic converter for at least the conversion of carbon monoxide and hydrocarbons, removal of a fraction of particulate matter, and decrease of sulfur trioxide emissions within exhaust gases from an engine and consequently of sulfuric acid, is disclosed. The DOC may include any suitable configuration including at least a substrate and a washcoat, where the substrate has a plurality of channels, suitable porosity, offers a three-dimensional support for the washcoat, and is made of any suitable material. The washcoat may be deposited on the substrate by any suitable method, and may include a mixture of at least one or more carrier material oxides and one or more catalysts. Suitable materials for the carrier material oxides may include titanium dioxide, tin dioxide, and zirconium dioxide, among others, excluding aluminum oxide ($Al_2O_3$), which may serve for a decrease of sulfur trioxide emissions and consequently of sulfuric acid mist. Suitable catalysts within the washcoat may include platinum, palladium, rhodium, and iridium, among others.

14 Claims, 2 Drawing Sheets

SYSTEMS AND METHODS FOR DIESEL OXIDATION CATALYST WITH DECREASED SO₃ EMISSIONS

BACKGROUND

1. Field of the Disclosure

The present disclosure relates generally to catalytic converters, and more particularly to a diesel oxidation catalyst for decreasing sulfur trioxide emissions and consequently sulfuric acid mist.

2. Background Information

One problem faced in the treatment of diesel engine exhaust is presented by the presence of sulfur in diesel fuel. Upon combustion, sulfur forms sulfur dioxide ($SO_2$), which a diesel oxidation catalyst (DOC) catalyzes to sulfur trioxide ($SO_3$) with subsequent formation of condensable acidic sulfur compounds, such as sulfuric acid, which condense upon and thereby add to the mass of particulates. Additionally, sulfuric acid can cause corrosion of the downstream exhaust system leading to perforation and damage to components. DOCs are also generally used for burning (oxidizing) HC and CO as well as some of the soluble organic compounds that are adsorbed on soot particles. Additionally, DOCs may be used for oxidizing nitrous oxides ($N_2O$) to nitrogen dioxide ($NO_2$). Under certain conditions, presence of $NO_2$ may not be favorable, such as in mining or other underground conditions, because the $NO_2$ may be toxic. On the other hand, in other conditions, especially when a DPF is located after the DOC, $NO_2$ formation may be favorable because it may oxidize soot which may help to regenerate the DPF.

Typical DOCs include a coating of one or more carrier material oxides, such as aluminum oxide, silicon dioxide, titanium dioxide, and cerium oxide, as well as mixtures thereof; one or more zeolites for absorbing HCs; and platinum, in addition to small amounts of palladium, in ratios of about 15:1, 10:1, 5:1, 3:1, 2.5:1, and 1:1, employed as a catalytically active component on a ceramic or metal substrate. The employed carrier material oxides have a large surface area of about 150 m²/g to about 300 m²/g and may generally remain stable up to exhaust gas temperatures of about 800° C. In order to achieve a high degree of catalytic activity, the catalysts are distributed very finely on the carrier material oxides, producing high amounts of $SO_3$. Deterioration in activity of the oxidation catalyst caused by sulfur from $SO_3$, as well as contamination and corrosion from sulfuric acid mist, are a major concern.

SUMMARY

The present disclosure relates to a diesel oxidation catalyst (DOC) catalytic converter that uses oxygen for converting at least carbon monoxide (CO) to carbon dioxide ($CO_2$) and hydrocarbons (HC) to water and $CO_2$, while suppressing the formation of sulfur trioxide ($SO_3$) and consequently of sulfuric acid ($H_2SO_4$) mist within exhaust gases from an engine. Additionally, the present DOC may be used for removal of a fraction of particulate matter (PM). The DOC may include at least a substrate and a washcoat, although other suitable configurations may be utilized.

According to aspects of the present disclosure, the substrate may be a refractive material, a ceramic substrate, a honeycomb structure, a metallic substrate, a ceramic foam, a metallic foam, a reticulated foam, or suitable combinations, where the substrate may have a plurality of channels and a suitable porosity and offers a three-dimensional support for the washcoat. Suitable materials for the substrate may include alumina, silica alumina, silica, titania, sillimanite, zirconia, petalite, spodumene (lithium aluminum silicate), magnesium silicates, mullite, alumina, cordierite, other alumino-silicate materials, silicon carbide, silicon nitride, aluminum nitride, and combinations thereof.

The washcoat material may be deposited on the substrate by suspending oxide solids in water to form an aqueous slurry and depositing the aqueous slurry on the substrate. Other components may optionally be added to the aqueous slurry to adjust rheology of the slurry and/or enhance binding of the washcoat to the substrate. The slurry may be placed on the substrate in any suitable manner, such as dip coating or spray coating.

The washcoat material may include oxide solids with a mixture of at least one or more carrier material oxides and one or more catalysts. Suitable carrier material oxides within the washcoat may include titanium dioxide, tin oxide, and zirconium dioxide, among others. Additional aspects of the present disclosure may involve excluding conventionally used aluminum oxide ($Al_2O_3$) as a carrier material oxide. Excluding $Al_2O_3$ may serve for decreasing amounts of $SO_3$, produced when sulfur in the exhaust gas makes contact with the catalyst in the washcoat. Excluding $Al_2O_3$ may further permit decreasing $SO_3$ by about 10 times or more, and may inhibit formation of corrosive $H_2SO_4$ mist.

Finally, suitable catalysts in the washcoat for oxidation of CO and HC may include platinum and palladium in ratios of about 18:1, 15:1, 10:1, 5:1, 3:1, 2.5:1, and 1:1, although other suitable catalysts, such as rhodium and iridium, may be employed at other suitable ratios. The DOC of the present disclosure may be suitable for the oxidative purification of exhaust gases from diesel engines running on high-sulfur diesel because of a high decrease of $SO_3$ production and consequently of lower levels of $H_2SO_4$ mist.

LIST OF FIGURES

Embodiments of the present disclosure are described by way of example with reference to the accompanying figures, which are schematic and are not intended to be drawn to scale. Unless indicated as representing prior art, the figures represent aspects of the present disclosure.

FIG. 1 depicts a diesel oxidation catalyst (DOC) configuration including a substrate and a washcoat, according to an embodiment.

FIG. 2 depicts the DOC from the present disclosure employed in an exhaust cleaning system of a diesel vehicle, according to an embodiment.

DETAILED DESCRIPTION

Definitions

As used herein, the following terms have the following definitions:

"$SO_3$ decrease" refers to inhibiting formation of sulfur trioxide by catalytic reactions of materials included in oxide solids in a diesel oxidation catalyst.

"$H_2SO_4$ decrease" refers to inhibiting formation of vapor sulfuric acid as a result of $SO_3$ decrease.

"Oxide solids" refers to materials including those selected from the group of at least a carrier material oxide, a catalyst, and/or a mixture thereof.

"Carrier material oxides" refers to support materials used for providing a surface for at least one catalyst.

"Catalysts" refers to materials employed for conversion of at least hydrocarbons and carbon monoxide from exhaust gases.

DESCRIPTION OF THE DRAWINGS

Various example embodiments of the present disclosure are described more fully with reference to the accompanying drawings in which some example embodiments of the present disclosure are shown. In the drawings, the thicknesses of layers and regions may be exaggerated for clarity. Detailed illustrative embodiments of the present disclosure are disclosed herein. However, specific structural and functional details disclosed herein are merely representative for purposes of describing example embodiments of the present disclosure. This disclosure however, may be embodied in many alternate forms and should not be construed as limited to only the embodiments set forth herein.

The present disclosure describes a diesel oxidation catalyst (DOC) that includes at least a substrate and a washcoat that may be treated and deposited on the substrate. The DOC of the present disclosure may permit decreasing sulfur trioxide ($SO_3$) by about 10 times or more, and consequently a decrease of sulfuric acid ($H_2SO_4$) mist.

Substrate Composition

Figure 1:
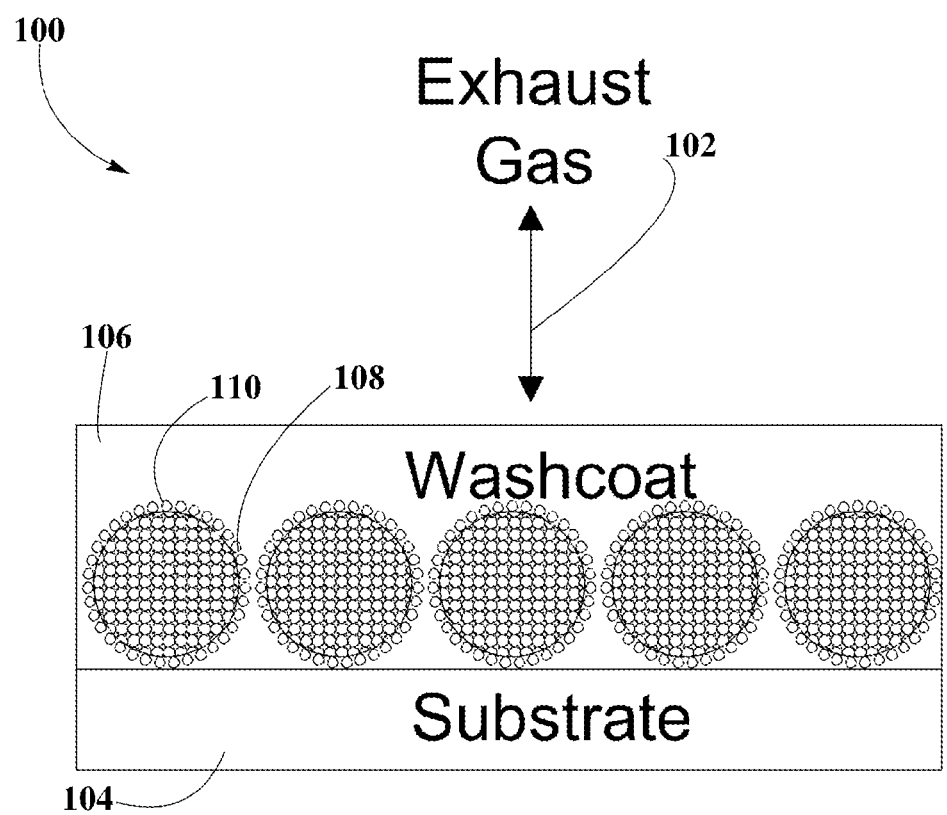

FIG. 1 shows a DOC 100 that may generally be mounted before a diesel particulate filter (DPF) in an exhaust pipe of an engine, and which may be used at least to oxidize hydrocarbons (HC) and carbon monoxide (CO), remove parts of particulate matter (PM), and decrease $SO_3$ and consequently $H_2SO_4$ within an Exhaust Gas 102. DOC 100 may generally be set in different configurations that may include at least a Substrate 104 and a Washcoat 106, although other configurations may be employed.

Substrate 104 may be a refractive material, a ceramic substrate, a honeycomb structure, a metallic substrate, a ceramic foam, a metallic foam, a reticulated foam, or suitable combinations, where Substrate 104 may have a plurality of channels and a suitable porosity. Substrate 104, either metallic or ceramic, may offer a three-dimensional support structure.

According to an embodiment, Substrate 104 may be in the form of beads or pellets, or any suitable form. Substrate 104 may be formed from any suitable material, including alumina, silica alumina, silica, titania, and mixtures thereof. In another embodiment, Substrate 104 may be a ceramic honeycomb Substrate 104 or a metal honeycomb Substrate 104. The ceramic honeycomb Substrate 104 may be formed from any suitable material, including sillimanite, zirconia, petalite, spodumene (lithium aluminum silicate), magnesium silicates, mullite, alumina, cordierite (e.g. Mg2A14Si5O18), other alumino-silicate materials, silicon carbide, silicon nitride, aluminum nitride, and combinations thereof. The metal honeycomb Substrate 104 may be formed from a heat-resistant base metal alloy, particularly an alloy that includes iron.

According to an embodiment, Substrate 104 may be a monolithic carrier having a plurality of fine, parallel flow passages extending through the monolith. The passages can be of any suitable cross-sectional shape and/or size. The passages may be of any suitable shape, including trapezoidal, rectangular, square, sinusoidal, hexagonal, oval, and circular. The monolith may contain from about 9 to about 1200 or more gas inlet openings or passages per square inch of cross section, although fewer passages may be used.

Washcoat Preparation and Deposition Method

According to an embodiment, Washcoat 106 may be formed on Substrate 104 by suspending oxide solids in water to form an aqueous slurry and depositing the aqueous slurry on Substrate 104. Other components may optionally be added to the aqueous slurry to adjust rheology of the slurry and/or enhance binding of Washcoat 106 to Substrate 104. These other components may include acid or base solutions or various salts or organic compounds, such as ammonium hydroxide, aluminum hydroxide, acetic acid, citric acid, tetraethylammonium hydroxide, other tetralkylammonium salts, ammonium acetate, ammonium citrate, glycerol, commercial polymers such as polyethylene glycol, polyvinyl alcohol and other suitable polymers.

The slurry may be placed on Substrate 104 in any suitable manner. For example, Substrate 104 may be dipped into the slurry, or the slurry may be sprayed on Substrate 104. If Substrate 104 is a monolithic carrier with parallel flow passages, Washcoat 106 may be formed on the walls of the passages. Exhaust Gas 102 flowing through the flow passages can contact Washcoat 106 on the walls of the passages as well as materials that are supported on Washcoat 106.

Washcoat Composition

Suitable carrier material oxides within oxide solids in Washcoat 106 may include thermally stable and very high surface area materials. Surface area of carrier material oxides may range from 150 $m^2/g$ to about 350 $m^2/g$, and may generally be stable at temperatures of about 700° C. to about 1000° C., with 800° C. being preferred.

Carrier material oxides generally used in the art include beta zeolites, MFI, ZSM-5, ferrierite, and SAPO's, and other zeolites, with a ratio of silica ($SiO_2$) to aluminum oxide ($Al_2O_3$) of about 8:200. Other suitable materials used in the art may generally include oxygen storage materials, doped aluminum oxide, spinel, delafossite, lyonsite, garnet, perovksite, pyrochlore, doped ceria, fluorite, zirconium oxide, doped zirconia, titanium oxide, tin oxide, silicon dioxide, zeolite, and mixtures thereof.

According to an aspect of the present disclosure, suitable Carrier Material Oxides 108 in Washcoat 106 may include titanium dioxide ($TiO_2$), tin dioxide ($SnO_2$), and zirconium dioxide ($ZrO_2$), amongst others. Additional aspects of the present disclosure may involve excluding $Al_2O_3$ as a carrier material oxide in Washcoat 106, which may serve for decreasing $SO_3$, produced when sulfur in Exhaust Gas 102 makes contact with the catalyst within Washcoat 106. $SO_3$ may plug filters and corrode parts of a vehicle's exhaust system, and may lead to formation of $H_2SO_4$ mist, which is a highly corrosive contaminant. Excluding aluminum oxide may permit decreasing $SO_3$ by about 10 times or more.

Finally, suitable Catalysts 110 in Washcoat 106 for oxidation of CO and HC may include platinum/palladium in ratios of about 18:1, 15:1, 10:1, 5:1, 3:1, 2.5:1, and 1:1, although other suitable Catalysts 110, such as rhodium and iridium, may be employed at other suitable ratios. The Catalysts 110 from DOC 100 use $O_2$ (oxygen) in Exhaust Gas 102 to convert at least CO to $CO_2$ (carbon dioxide) and HC to $H_2O$ (water) and $CO_2$.

Table 1 shows a comparison of $SO_3$ production performed by a standard 18/1/0 (Pt, Pd, and Rh in $g/ft^3$) DOC and an 18/1/0 DOC 100 on $TiO_2$. As may be appreciated, the production of $SO_3$ by a standard DOC is defined as 100%, while the relative production by 18/1/0 DOC 100 on $TiO_2$ is of about 12%. Additional data shown on Table 1 are the CO and HC conversion by each of these DOCs. For the CO and HC conversion, measurements were performed after the catalysts were aged at about 750° C. for about 5 hours and then exposed to $SO_2$ poisoning for about 100 ppm $SO_2$ at about 300° C. for about 100 hours, plus about 50 minutes of about 30 ppm of $SO_2$ at about 300° C. The $SO_3$ production was measured on fresh catalysts.

TABLE 1

| Sample Description | 18/1/0 Standard DOC | 18/1/0 on $TiO_2$ |
|---|---|---|
| Relative $SO_3$ Production % | 100% | 12% |
| CO Conversion % | 99.23% | 99.15% |
| HC Conversion % | 98.12% | 94.86% |

Table 2 shows the production of $SO_3$ and conversion of CO and HC by DOCs at 3/3/0. As may be appreciated, the production of $SO_3$ by a standard CS-570 DOC at 3/3/0 is defined as 100%. At these conditions, the relative $SO_3$ production by a DOC 100 on $TiO_2$ is of about 20%; the relative $SO_3$ production by a DOC on (69% $ZrO2$, 29% $SnO_2$, 1.4% CaO) is of about 100.01%; and the relative $SO_3$ production by a DOC on $SnO_2$ is of about 50%. Additional data shown on Table 2 are the CO and HC conversion by each of these DOCs. For the CO and HC conversions, measurements were performed after the catalysts were aged at about 750° C. for about 5 hours and then exposed to $SO_2$ poisoning for about 100 ppm $SO_2$ at about 300° C. for about 100 hours, plus about 50 minutes of about 30 ppm of $SO_2$ at about 300° C. The $SO_3$ production was measured on fresh catalysts.

TABLE 2

| Sample Description | Standard CS-570 DOC (3/3/0) | 3/3/0 on $TiO_2$ | 3/3/0 on (69% $ZrO_2$, 29% $SnO_2$, 1.4% CaO) | 3/3/0 on $SnO_2$ |
|---|---|---|---|---|
| Relative $SO_3$ Production % | 100% | 20% | 100.01% | 50% |
| CO Conversion % | 96.77% | 94.79% | 97.89% | 98.16% |
| HC Conversion % | 98.30% | 89.16% | 94.54% | 94.80% |

Table 3 shows the production of $SO_3$ and conversion of CO and HC by DOCs at 0/20/0 being compared to the standard CS-570 DOC at 3/3/0, defined as 100%. As may be appreciated, the relative $SO_3$ production by a DOC 100 on $TiO_2$ at these conditions is of about 44%, and the relative $SO_3$ production by a DOC on (69% $ZrO2$, 29% $SnO_2$, 1.4% CaO) is of about 23%. Comparing DOC (69% $ZrO2$, 29% $SnO_2$, and 1.4% CaO) at 3/3/0 (100.01%) and at 0/20/0 (23%), a large reduction of $SO_3$ production may be appreciated when using only Pd as a catalyst 110 within Washcoat 106. Additional data shown on Table 3 are the CO and HC conversion by each of these DOCs. For the CO and HC conversions, measurements were performed after the catalysts were aged at 750° C. for about 5 hours and then exposed to $SO_2$ poisoning for about 100 ppm $SO_2$ at about 300° C. for about 100 hours, plus about 50 minutes of about 30 ppm of $SO_2$ at about 300° C. The $SO_3$ conversion was measured on fresh catalysts.

TABLE 3

| Sample Description | Standard CS-570 DOC (3/3/0) | 0/20/0 on $TiO_2$ | 0/20/0 on (69% $ZrO_2$, 29% $SnO_2$, 1.4% CaO) |
|---|---|---|---|
| Relative $SO_3$ Production % | 100% | 44% | 23% |
| CO Conversion % | 96.77% | 91.84% | 93.90% |
| HC Conversion % | 98.30% | 94.54% | 96.35% |

Figure 2:
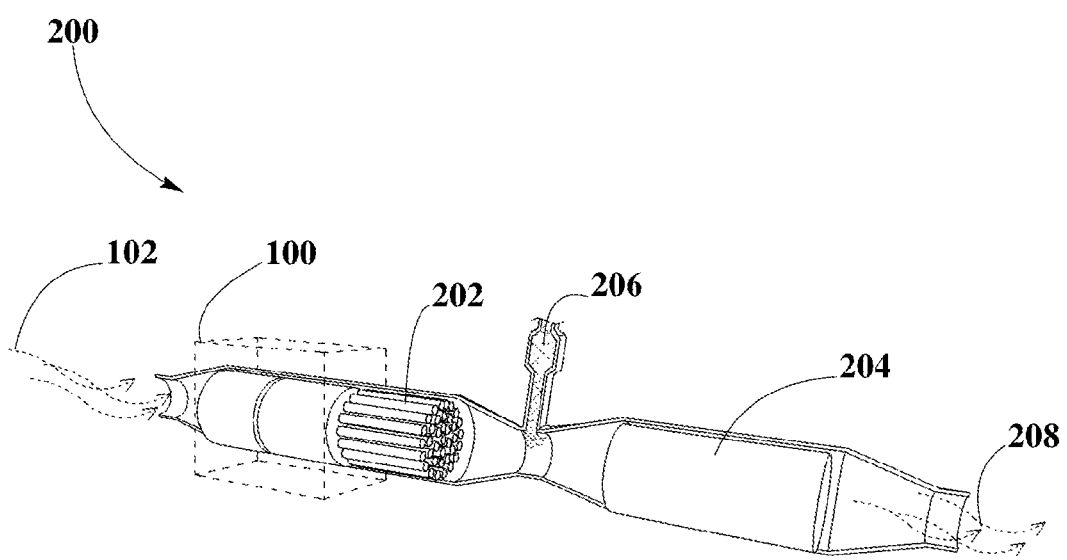

FIG. 2 shows an Exhaust Cleaning System 200 that includes a DOC 100 for oxidizing HC and CO, eliminating a fraction of PM, and decreasing $SO_3$ emissions and consequently production of $H_2SO_4$ mist, according to an embodiment. FIG. 2 includes Exhaust Gas 102, a DOC 100, a diesel particulate filter (DPF 202), Urea 206, a selective catalytic reduction (SCR 204), and a Cleaned Exhaust Gas 208.

EXAMPLES

Example #1 is an embodiment of an Exhaust Cleaning System 200. Initially, DOC 100 oxidizes CO to $CO_2$ and HC to $H_2O$ (water) and $CO_2$ from incoming Exhaust Gas 102, while removing a fraction of PM (up to 90%) and decreasing $SO_3$ emissions by about 10 times or more and consequently formation of $H_2SO_4$ mist. Subsequently, Exhaust Gas 102 passes through DPF 202, which is a soot trap for removing remaining PM and soot from Exhaust Gas 102. DPF 202 may include a cordierite or silicon carbide substrate with a geometry that forces Exhaust Gas 102 to flow through the substrate walls. Other suitable materials may be employed in DPF 202, such as rare metals including palladium, silver, or platinum, for providing higher efficiency. Finally, Urea 206 may be injected before SCR 204 for thermal decomposition and hydrolysis to form ammonia, which reduces $NO_x$ into nitrogen, resulting in a Cleaned Exhaust Gas 208. Urea 206 may be commercially available as AdBlue, although other commercially available Urea 206 may be employed.

Example #2 is a second DOC configuration for oxidizing HC and CO and decreasing $SO_3$ emissions. The second DOC configuration includes a substrate, a washcoat including at least one catalyst and carrier oxide materials, and an overcoat including at least one catalyst material.

Example #3 is a third DOC configuration for oxidizing HC and CO and decreasing $SO_3$. The third DOC configuration includes a substrate, a washcoat including carrier oxide materials but no catalyst materials, and an overcoat including catalyst materials.

I claim:

1. A method for reducing emissions from a diesel engine having associated therewith an exhaust system, the method providing a catalyst system for a catalytic reaction, the method further comprising the steps of:
    providing a substrate; and
    depositing on said substrate a washcoat suitable for deposition on the substrate and comprising at least one carrier material oxide, at least one catalyst, or mixtures thereof, wherein the at least one carrier material oxide is selected from the group consisting of titanium oxide, tin dioxide, zirconium dioxide and aluminum oxide, and wherein the catalyst comprises platinum and palladium; and
    wherein at least one carbon monoxide and at least one hydrocarbon is oxidized by the catalyst system, and wherein oxidation of sulfur dioxide also occurs and is at a lower percentage than that achievable without the at least one carrier material oxide;
    wherein the washcoat further comprises at least one second catalyst, wherein the at least one second catalyst comprises rhodium and iridium; and wherein the ratio of rhodium to iridium is selected from the group consisting of about 18:1, about 15:1, about 10:1, about 5:1, about 3:1, about 2.5:1, and about 1:1.

2. The method of claim 1, wherein the substrate is selected from the group consisting of a refractive material, a ceramic substrate, a honeycomb structure, a metallic substrate, a ceramic foam, a metallic foam, a reticulated foam, and mixtures thereof.

3. The method of claim 1, wherein the substrate comprises a plurality of channels.

4. The method of claim 1, wherein the substrate comprises at least one of the group consisting of alumina, silica alumina, silica, titania, sillimanite, zirconia, petalite, lithium aluminum silicate, magnesium silicates, mullite, alumina, cordierite, silicon carbide, silicon nitride, and aluminum nitride.

5. The method of claim 1, where the washcoat is formed by deposition of a slurry.

6. The method of claim 5, wherein the deposition of the slurry is by dip coating or spray coating.

7. The method of claim 1, wherein the washcoat further comprises at least one oxide solid.

8. The method of claim 1, wherein the at least one catalyst consists of platinum and palladium.

9. The method of claim 1, wherein the ratio of platinum to palladium is selected from the group consisting of about 18:1, about 15:1, about 10:1, about 5:1, about 3:1, about 2.5:1, and about 1:1.

10. The method of claim 1, wherein the at least one carrier material oxide is titanium oxide and the oxidation of sulfur dioxide is reduced by about 50%.

11. The method of claim 1, wherein the at least one carrier material oxide is titanium oxide and the oxidation of sulfur dioxide is reduced by about 80%.

12. The method of claim 1, wherein the at least one carrier material oxide is tin dioxide and the oxidation of sulfur dioxide is reduced by about 50%.

13. The method of claim 1, further comprising depositing on said substrate of an overcoat comprising the at least one catalyst.

14. The method of claim 1, further comprising depositing on said substrate of an overcoat comprising at least one second catalyst.

* * * * *